United States Patent [19]

Fletcher et al.

[11] 4,052,181

[45] Oct. 4, 1977

[54] ACOUSTIC ENERGY SHAPING

[76] Inventors: James C. Fletcher, Administrator of the National Aeronautics and Space Administration, with respect to an invention of Taylor G. Wang, Glendale; Daniel D. Elleman, San Marino, both of Calif.

[21] Appl. No.: 658,133

[22] Filed: Feb. 13, 1976

[51] Int. Cl.² ............... C03B 37/00; C03B 15/14
[52] U.S. Cl. ............................ 65/2; 65/32; 65/87; 65/102; 65/DIG. 4; 65/DIG. 7; 65/4 B; 73/505; 264/23; 264/345
[58] Field of Search ........... 65/108, 109, 110, DIG. 4, 65/DIG. 7, 32, 111, 4 B, 108, 102, 2, 87; 73/505

[56] References Cited

U.S. PATENT DOCUMENTS

| | | | |
|---|---|---|---|
| 3,328,146 | 6/1967 | Hanlein | 65/108 X |
| 3,424,838 | 1/1969 | Buus | 65/108 X |
| 3,588,440 | 6/1971 | Morse | 65/DIG. 4 |
| 3,620,707 | 11/1971 | Van Damme | 65/110 X |
| 3,626,143 | 12/1971 | Fry | 65/DIG. 4 |
| 3,629,546 | 12/1971 | Fry | 65/DIG. 4 |
| 3,660,062 | 5/1972 | Keller | 65/DIG. 7 |
| 3,865,564 | 2/1975 | Jaeger et al. | 65/32 X |
| 3,882,732 | 5/1975 | Fletcher et al. | 73/505 |
| 3,944,640 | 3/1976 | Haggerty et al. | 65/2 X |

*Primary Examiner*—S. Leon Bashore
*Assistant Examiner*—Frank W. Miga
*Attorney, Agent, or Firm*—Monte F. Mott; Wilfred Grifka; John R. Manning

[57] ABSTRACT

A suspended mass is shaped by melting all or a selected portion of the mass and applying acoustic energy in varying amounts to different portions of the mass. In one technique for forming an optical waveguide slug, a mass of oval section is suspended and only a portion along the middle of the cross-section is heated to a largely fluid consistency. Acoustic energy is applied to opposite edges of the oval mass to press the unheated opposite edge portions together so as to form bulges at the middle of the mass. In another technique for forming a ribbon of silicon for constructing solar cells, a cylindrical thread of silicon is drawn from a molten mass of silicon, and acoustic energy is applied to opposite sides of the molten thread to flatten it into a ribbon.

2 Claims, 5 Drawing Figures

ACOUSTIC ENERGY SHAPING

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to methods and apparatus for shaping material by the use of acoustic energy.

There are many industrial processes which require the molding of materials while avoiding contamination from the walls of a mold. For example, optical glass which is to be formed into waveguides, and silicon which is to be formed into solar cells, must often be formed into complex shapes while avoiding even slight contamination. Our U.S. Pat. No. 3,882,732 on "Material Suspension Within An Acoustically Excited Resonant Chamber" describes techniques for suspending masses and shaping them into simple geometric shapes by the application of acoustic energy of frequencies resonant to the chamber. However, in many applications, more complex shapes are required.

SUMMARY OF THE INVENTION

In accordance with one embodiment of the present invention, methods are provided for shaping portions of a mass by applying intense acoustic energy to only selected portions of the mass. In one method which is utilized to create protuberances in a mass, only a middle region of the mass is melted. Portions of the mass on opposite sides of the melted region are pressed towards one another by acoustic energy, to cause the melted region to bulge. In another method which is utilized to form a ribbon of material, a thread of material is drawn from a molten mass, while transducers on opposite sides of the threaded are energized to press against the thread and flatten it into a ribbon. In still another method utilized to form a mass into a selected shape, a first group of transducers driven at low frequency is utilized to acoustically suspend an entire molten mass, while groups of additional high frequency transducers are utilized to press against selected regions of the mass to mold it.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
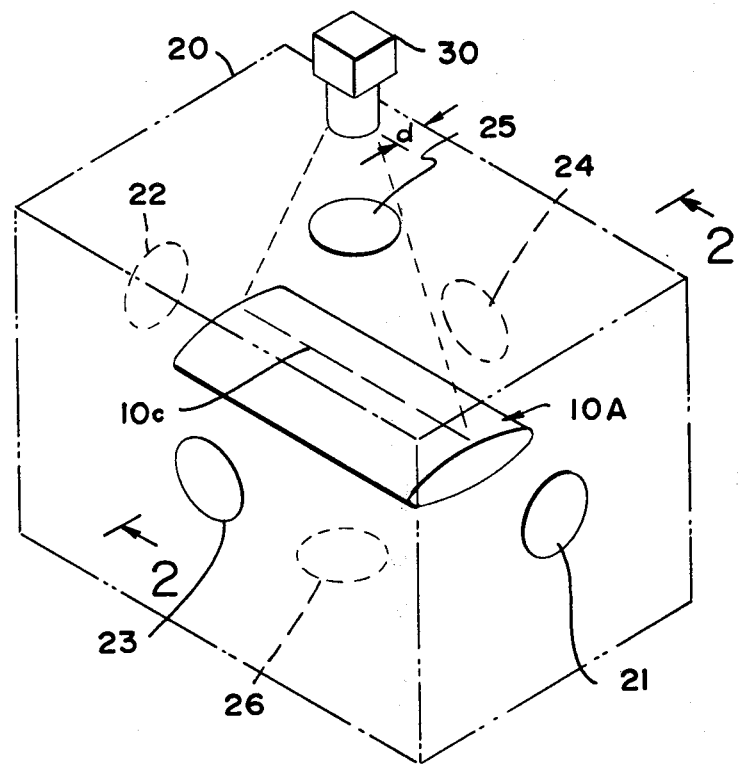
FIG. 1 is perspective view of one method of the invention shown at a first stage thereof.
Figure 2:
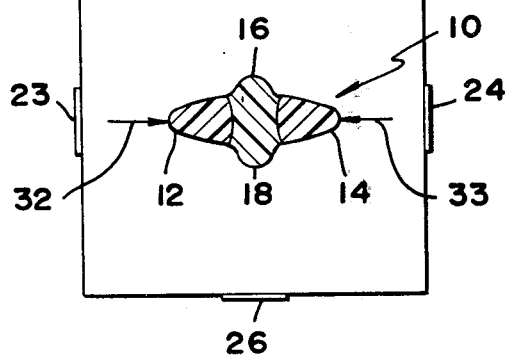
FIG. 2 is a sectional view taken on the line 2—2 of FIG. 1, at a later stage of the process.

FIGS. 1 and 2 illustrate a method for forming a slug 10 of fiber optic material so that its cross-section defines an oval with opposite ends 12, 14 and with bulges 16, 18 at the sides. The slug 10 is intended to be drawn into a long optical fiber that will carry modulated light to transmit large quantities of information. It is found that when the slug is heated and its ends pulled apart to form a long fiber, the fiber retains the same cross-sectional shape as the original slug. The bulges 16, 18 are included in order to enable selection of mode of propagation of light through the fiber. It is important that there be virtually no impurities in the slug 10, because when the slug is drawn into a fine fiber any impurities might be large enough to block or impair light transmission through that location of the fiber. At the present state of technology a large portion, such as 80% of the drawn fiber material, is not useful.

In accordance with the present invention, an initial slug 10A is formed which is of somewhat oval cross-section. This is accomplished by heating a mass of fiber optic material to a state of low viscosity while suspending it within the walls of chamer 20 by the use of acoustic energy. Six transducers 21 – 26 are utilized to establish a standing wave pattern within the chamber which produces a node, or point of lowest acoustic pressure, at the center of the chamber to urge the mass towards the center. The transducers 21, 22 at opposite ends of the intended slug 10A are energized at a very low level to allow the mass level to expand lengthwise. The transducers 25, 26 are energized at a high level to cause flattening of the slug, while transducers 23, 24 are energized at a moderate level. In the process of this embodiment of the invention, the slug 10A is allowed to cool into a shape with a largely oval cross-section.

After the slug 10A has cooled so that it is hard or very viscous, the center portion 10c is heated as by a laser beam from a source 30, spaced a distance $d$ from the rear chamber wall, which emits a beam of color which is absorbed by the material of the slug. Of course, opposite sides of the middle portion can be heated by using two sources. With the center portion 10c heated to achieve a low viscosity, the transducers 23, 24 are energized at a high energy level, so that considerable forces, indicated by arrows 32, 33 are applied to the opposite ends 12, 14 of the slug. This causes the relatively solid opposite ends 12, 14 to press towards one another and cause the middle portion to be squeezed between them and form the bulges 16, 18. While the acoustic energy is thus applied, the slug is allowed to cool. The slug then can be drawn into lengths of optical fiber which will retain the same cross-section.

Figure 3:
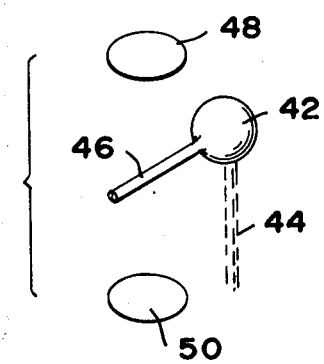
FIG. 3 is a partial perspective view of a shaping method of another embodiment of the invention.
Figure 4:
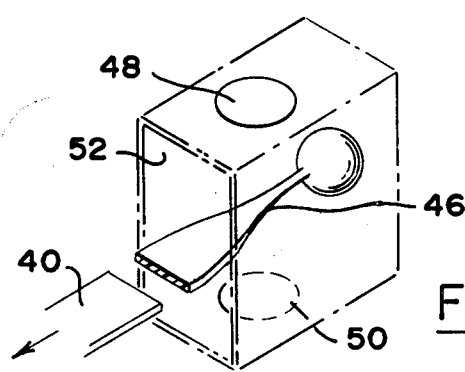
FIG. 4 is a view similar to FIG. 3, but at a later stage of the process.

FIGS. 3 and 4 illustrate a method for forming a ribbon 40 of material such as silicon which is utilized in ribbon form in the construction of solar cells and other electronic devices. A mass 42 of highly purified silicon is suspended, as with acoustic energy or on a supporting foot indicated at 44, and a thread 46 of material is pulled from the mass. Normally, the thread 46 will form a circular cross-section, which is often not useful. In accordance with the present invention, a pair of transducers 48, 50 is positioned on opposite sides of the thread 46, and the transducers are energized to apply acoustic pressure to the thread. The acoustic pressure causes flattening of the thread into the ribbon shape indicated at 40. The acoustic energy can be applied by partially enclosing the thread in a tube 52 and energizing the transducers 48, 50 at a frequency which is harmonic to the height of the tube to create a standing wave pattern in the tube. Alternatively, the transducers 48, 50 can be energized with high frequency currents. The atmosphere in which the forming occurs is preferably established by an inert gas that will prevent contamination and capable of transmitting acoustic energy.

Figure 5:
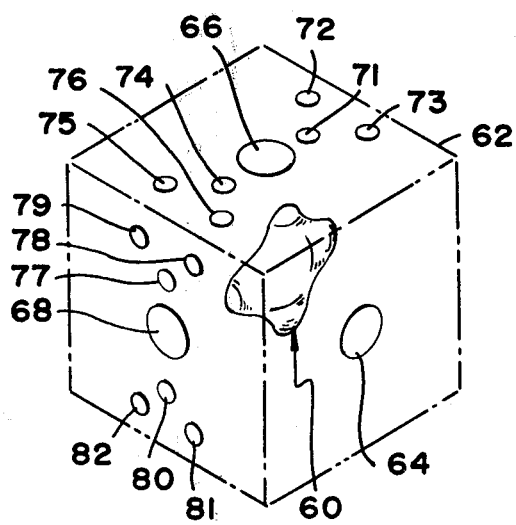
FIG. 5 is a perspective view of apparatus constructed in accordance with another embodiment of the invention.

FIG. 5 illustrates another method for forming a mass into an object 60 of a complex configuration, without establishing contact between the mass and mold walls that could contaminate the material. The apparatus includes walls 62 forming a rectangular chamber containing the mass, and three suspension transducers 64, 66, 68 which generate low frequency sound waves of frequencies that establish a standing wave pattern that urges the mass to remain at the center of the chamber. Additional transducers 71 – 82 are utilized which are driven at a much higher frequency, to apply forces at selected regions of the mass. The mass is heated to a molten state while suspended by the transducers 64 – 69. While the mass is molten, the shaping transducers 71 – 82 are energized to shape the mass into a desired configuration such as the cruciform configuration shown in FIG. 5, and the hold the mass in this configuration while it cools to a solid state. A mass can be molded to any of a wide variety of shapes without requiring it to engage the wall of a specially built mold. This technique is useful in avoiding contamination of a mass and in the forming of materials having very high melting points.

Thus, the invention provides methods for shaping material without requiring physical contact of the shaped portion of the material with a solid mold wall or the like. This is accomplished by the application of acoustic energy to the portion of the material to be shaped. In one method, a bulge in the material is formed by melting only a middle portion of the mass and using acoustic energy to press opposite ends towards one another to squeeze the middle portion between them. In another method useful for forming a ribbon of material, sound waves are applied on opposite sides of a thread of material as it is continually drawn from a large mass of the material, to compress the thread into a ribbon. In still another method, group of transducers lying on different walls of a chamber, are energized to create acoustic forces to shape a molten mass into a desired shape.

Although particular embodiment of the invention have been described and illustrated herein, it is recognized that modifications and variations may readily occur to those skilled in the art and consequently it is intended that the claims be interpreted to cover such modifications and equivalents.

What is claimed is:

1. A method for shaping a mass of material comprising:
   suspending said mass in a gaseous atmosphere capable of transmitting acoustic energy;
   applying heat to only a middle portion of said mass to melt only said middle portion;
   applying acoustic energy to unmelted opposite sides of said mass to squeeze said melted middle mass portion between them; and
   allowing said middle mass portion to solidify.

2. A method for shaping a mass of material, comprising:
   suspending said mass in a gaseous atmosphere capable of transmitting acoustic energy;
   heating at least a portion of said mass to a substantially molten state;
   continually drawing a thread of said material from a substantially molten portion of said mass; and
   applying acoustic energy to opposite sides of said drawn thread to flatten said thread into a ribbon while allowing it to cool.

* * * * *